Jan. 18, 1927.
F. S. McCULLOUGH
1,615,023
METAL AND PORCELAIN ARTICLE AND METHOD OF MANUFACTURING THE SAME
Filed Oct. 3, 1925
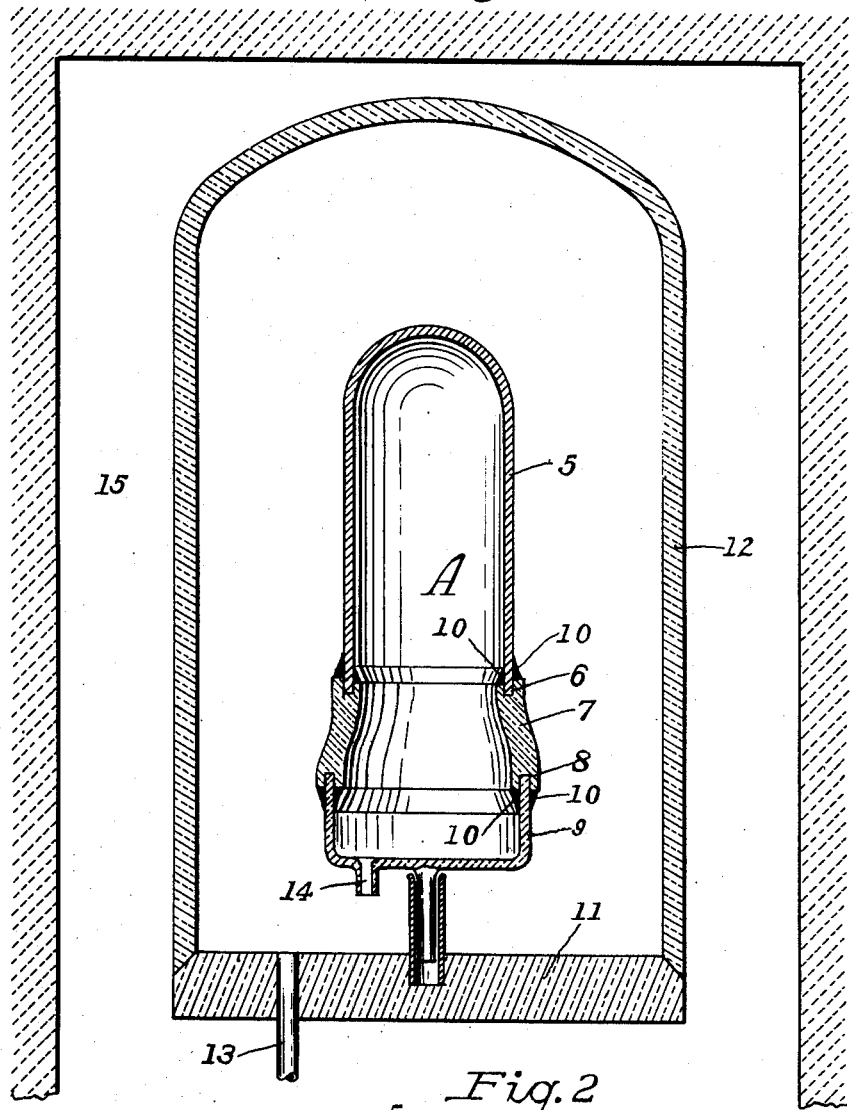
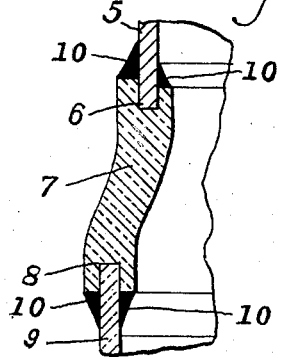
INVENTOR
Frederick S. McCullough Patented Jan. 18, 1927.

1,615,023

UNITED STATES PATENT OFFICE.

FREDERICK S. McCULLOUGH, OF EDGEWOOD, PENNSYLVANIA.

METAL AND PORCELAIN ARTICLE AND METHOD OF MANUFACTURING THE SAME.

Application filed October 3, 1925. Serial No. 60,200.

This invention relates to an article formed of metal and a plastic material, such as metal and porcelain, or metal and glass, and to a method of making the same.

In certain apparatus used for electrical and scientific purposes, particularly, it is necessary to connect metal and porcelain, or metal and glass, in such manner that the finished article will be absolutely air tight, which will not fracture under varying thermal conditions, and which can be produced without oxidation of the metal.

It has been proposed to seal glass directly to metal, but such a joint, which is extremely susceptible to fracture, must be made under conditions conducive to the oxidation of the metal, and under conditions which tend to render the metal porous. This is particularly true where the metal is copper.

According to the present invention it is proposed to form a joint between metal and porcelain or other similar plastic material, and then, if desirable, secure glass to the porcelain. The completed article may then be put in a suitable refractory container which is exhausted and sealed off and then subjected to a high temperature to effect a fusion of the porcelain and the metal and the porcelain and the glass, and also preferably to fire the porcelain, thereby obtaining a grade and texture to the porcelain of a superior quality.

In the accompanying drawings, which are merely diagrammatic and illustrative of one embodiment of the invention and a method of practicing the invention;

Figure 1 represents a vertical section through a heating chamber, evacuated container, and article to be produced; and Figure 2 is an enlarged detail section of a portion of the joint.

In the drawings, A designates an article to be produced. The representation shown is merely illustrative of several contemplated shapes and forms, the form of the article shown or the particular character thereof being more or less arbitrary and representative merely of an article which may be produced by the practice of the present invention.

I have shown the article A as being comprised of a metal shell or cylinder 5 whose one end may be set in a shoulder or groove 6 in the edge of a suitably dimensioned porcelain ring 7. In the bottom edge of the ring 7 there is preferably another shoulder or groove 8 into which a suitably shaped glass shell 9 is fitted. This shell 9 is preferably formed of high temperature glass and the porcelain sleeve may be in its raw form.

A paste or fillet of low fusion ceramic material is then arranged at the juncture of the metal and porcelain and the porcelain and glass. I have shown this material, designated 10, which, for instance, may be a zirconium compound, as being on both the inside and the outside of the article. Where the nature of the article is such as to preclude the fusible sealing material from being applied to the inside, it may be effectively used on the outside only.

The sealing material, such as zirconium oxide, is of such a nature that it fuses below the temperature at which the high temperature glass 9 becomes soft.

The porcelain ring 7 may be in either the semiplastic unfired state, or in a fired state, preferably the former.

The assembled structure, with the fusible ceramic material 10, may then be mounted on a suitable supporting base 11 in any suitable fashion. A refractory casing 12, such for instance as a silicon shell of extremely good quality and texture, is fitted over the article and sealed to the supporting base 11 and the entire shell exhausted by means of a pipe 13 going to an exhaust pump. The article A, if it is of a closed nature, preferably has a suitable air outlet 14, so that as the pressure in the refractory shell 12 is reduced, air may also be drawn out of the article A.

Then the shell is placed in a heating chamber 15 and the temperature thereof elevated to a point sufficient to fuse the material 10 and to bake the porcelain ring 7 if the same has not already first been baked. Care is taken to keep the glass from becoming so hot as to collapse.

As pointed out in my Patent No. 1,549,591 of August 11, 1925, porcelain fired under conditions that draws the contained gas out of the porcelain produces a porcelain of better texture and quality and more suited for some purposes than the porcelain fired in the open.

At the same time, the process is effected under conditions which preclude oxidation of the metal of the shell so that the metal is not injured.

The joint between the porcelain and the metal produced under these conditions is one that is tight and not likely to fracture under an extremely wide range of temperature variations. The same is true of the joint between the glass and porcelain.

Under some conditions the glass shell might be entirely omitted or a metal shell substituted therefor.

I claim as my invention:

1. As an article of manufacture, a metal body, a porcelain body fitted thereon, and a fusible bonding material connecting the two.

2. As an article of manufacture, a metal body, a porcelain body fitted thereon, a fusible material bonding the two, and a glass body secured to the porcelain one.

3. As an article of manufacture, a metal shell, a porcelain ring at one end thereof, and a seal formed between the ring and shell of a fusible zirconium compound.

4. As an article of manufacture, a metal shell, a porcelain ring sealed thereto, and a glass shell sealed to the porcelain ring.

5. As an article of manufacture, a metal shell, a porcelain ring joined to the shell, a high temperature glass shell joined to the porcelain ring, and a sealing material between the porcelain and the metal shell and between the porcelain and the glass shell fusible below the melting temperature of the glass.

6. As an article of manufacture, a metal shell, a porcelain ring joined to the shell, a high temperature glass shell joined to the porcelain ring, and a sealing material between the porcelain metal shell and between the porcelain and the glass shell fusible below the melting temperature of the glass and containing a zirconium compound.

7. A vessel provided with a glass portion and a metal portion, and a ring of ceramic material interposed between said glass and metal portions to which the respective portions are attached.

8. A method of making a composite article having a metal shell and a porcelain ring which consists in joining the two, applying a fusible material to the point of juncture, and effecting a fusion of such material in a vacuum.

9. A method of making a composite article having a metal shell and a porcelain ring, and having a glass shell joined to the ring which consists in applying a fusible material to the point of juncture between the glass and porcelain and between the porcelain and metal and fusing the fusible material under conditions precluding oxidation.

10. A method of making a composite article having a metal shell and a porcelain ring, and having a glass shell joined to the ring which consists in applying a fusible material to the point of juncture between the glass and porcelain and between the porcelain and metal and fusing the fusible material in a vacuum.

11. A method of forming a composite glass and metal article which consists in interposing a porcelain ring between the glass and metal and sealing the porcelain to the metal and sealing the glass to the porcelain.

12. A method of forming a composite glass and metal article which consists in joining the glass to a porcelain connector, and joining the metal to the porcelain, and then sealing the joints with a fusible material in a vacuum.

13. A method of forming a composite glass and metal article which consists in joining the glass to a porcelain connector, and joining the metal to the porcelain, and then firing the porcelain and sealing the joints with a fusible material in a vacuum.

14. A container having a glass portion and a metal portion, and a porcelain ring interposed between the two portions and to which the respective portions are sealed.

15. A vessel of the character described, including a metal member and a glass member, and a third member to which said metal and glass members are attached to constitute a unit.

In testimony whereof I have hereunto set my hand.

FREDERICK S. McCULLOUGH.